Jan. 12, 1943.　　　　G. A. GILLEN　　　　2,308,277
MANUFACTURE OF INDUCTION MOTORS
Filed March 23, 1939

GEORGE A. GILLEN
INVENTOR

BY
ATTORNEY

Patented Jan. 12, 1943

2,308,277

UNITED STATES PATENT OFFICE 2,308,277

MANUFACTURE OF INDUCTION MOTORS

George A. Gillen, New York, N. Y., assignor to Fuel & Metal Research Corporation, Brooklyn, N. Y., a corporation of New York Application March 23, 1939, Serial No. 263,633

4 Claims. (Cl. 164—18)

The present invention relates to the manufacture of induction motors and the broad objects of the invention are to simplify, reduce the cost and generally improve manufacture of electrical machines of this character.

Special objects of the invention are to enable rapid production of the laminations required for the stator and rotor elements from the same strip of ferrous stock, with the least possible waste or loss of material and to produce such elements in particularly accurate and efficient form.

The objects mentioned and other desirable objects are attained in the present invention by novel methods and features of construction all as hereinafter defined and broadly claimed.

The drawing accompanying and forming part of the following specification illustrates the novel and important features of the invention but it is to be understood that certain modifications and changes may be made without departure from the true scope of the invention as hereinafter set forth and broadly covered in the claims.

Figure 1:
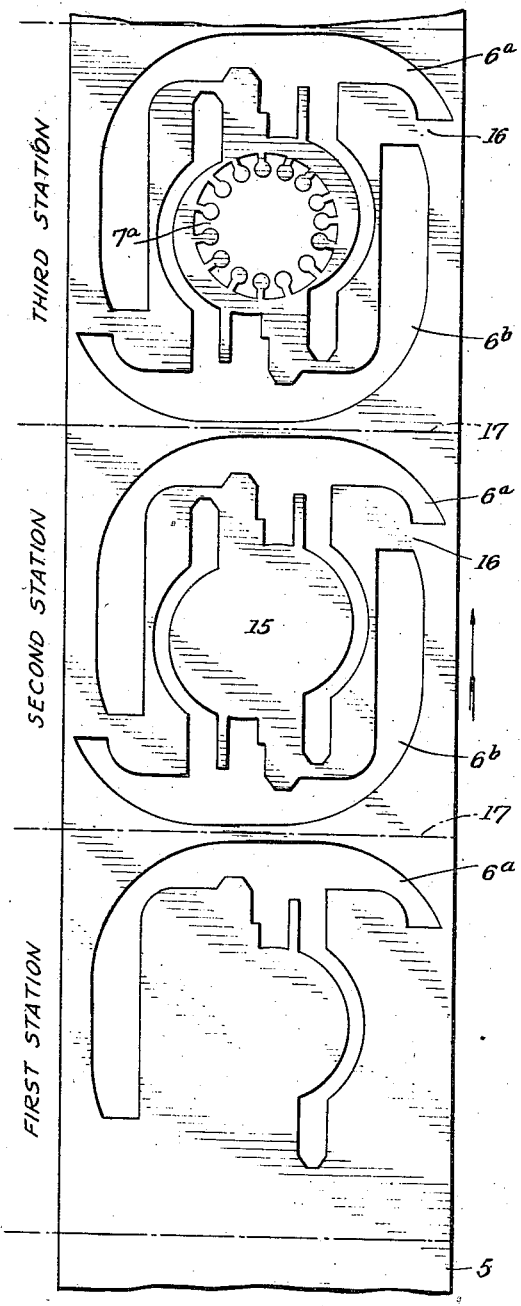
Figure 1 is a broken plan view of a length of the strip stock illustrating the successive operations of punching out the stator and rotor laminations.

In Figure 1 a strip of ferrous material suitable for the formation of stator and rotor laminations is indicated at 5.

Figure 2:
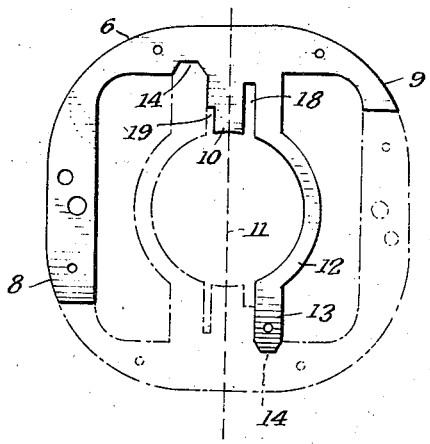
Figure 2 is a plan of one of the stator laminations.
Figure 3:
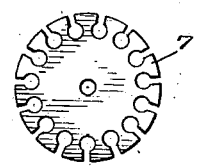
Figure 3 is a plan of one of the rotor laminations.

One of the stator laminations is illustrated at 6, Figure 2, and similarly one of the rotor laminations is shown at 7 in Figure 3.

The stator lamination is segmental in character, substantially crescent shaped, with relatively long and short arms 8, 9, and between these a polar projection 10, offset from a center line 11 toward the shorter arm 9. Projecting from the offset side of the polar portion is a single horn 12 arched to pass around one side of the rotor and terminating in a straight polar extension 13 adapted to seat in a socket 14 in a companion reversely disposed segment, thus to form a polar addition at the side of the pole piece on such other cooperating segment.

The dotted lines in Figure 2 indicate how this cooperation is effected and how one field segment thus in effect complements an opposing reversely placed segment to constitute a complete field frame with the longer arm of one abutting the shorter arm of the other and the horn of one pole piece forming one side of a rotor encircling ring and providing a polar addition completing the pole piece of the other companion segment.

The first step of the operation consists in striking the field segment described out of the lamination strip, thus leaving the outline of the segment as indicated at 6a, Figure 1.

As the next step of the operation a duplicate segment will be struck out of the strip in reversed position, with the material for the shorter and the longer arms taken out of the strip in positions substantially opposite the places where the long and short arms of the first lamination were struck out and with the material for the pole piece and the horn projecting from one side of the same struck out of that part of the strip opposite that part supplying the first pole piece and between that pole piece and the adjoining longer arm for the first mentioned blank, all as indicated by the cutout 6b.

The second step, as represented by the intermediate portion of the strip shown in Figure 1 leaves a more or less circular expanse of material at 15 between those portions where the pole pieces and arcuate polar extensions have been removed, sufficient in extent for material of the rotor.

The third step involves the punching of the rotor lamination 7 out of the substantially central portion 15, in the outline of such rotor substantially as indicated at 7a, at the top in Figure 1.

This method utilizes a maximum of the material and at the same time leaves the strip with enough connecting material after each step to permit striking out of the material of the next step without distorting, tearing or straining and with each part accurately and cleanly cut. The waste remaining after the three operations is relatively small, as will be clear from the appearance of the remaining material at the top of Figure 1.

In commercial practice the operations are carried out in a three stage press having one die to strike out the first field lamination at 6a, a second die to strike out a duplicate field lamination in reversed position at 6b and a third die to strike out the rotor lamination at 7a. These three dies operate simultaneously or substantially so at each stroke of the press so that for each operation the press will strike out two similar field laminations and one rotor lamination. The feed movement of the strip for each blow of the press only needs to be a distance approximately equal to the overall dimension of a field lamination plus the narrow connecting length of material at 16 between two opposed laminations and the narrow connecting material at 17 between adjoining complete cutouts.

In the particular embodiment illustrated the field laminations each are punched with a shading coil slot 18, Figure 2, in the projecting polar portion and a shading coil seating shoulder 19 at the hornless side.

What is claimed is:

1. The method of manufacturing the laminations for an induction motor which comprises punching out of a ferrous strip, a crescent shaped field segment having an intermediate polar projection between the ends of the same and a single horn extending from one side of said polar projection, then punching a second similar segment from the strip in reversed order with the polar projection and horn of the same removed from that part of the strip stock remaining between the position of the polar structure and adjoining end portion taken out for the first field segment and then striking a rotor lamination out of that portion of the material remaining between the cutouts left after removal of the oppositely disposed horns of the two field segments.

2. The method of manufacturing laminations for an induction motor which comprises punching duplicate reversely disposed field segment laminations out of a strip of ferrous material, with the material for one segmental lamination and projecting polar horn removed from portions of the strip opposite the ends of the other field segment and between portions of the material removed for the polar horn and adjoining end of the other field segment.

3. The method of manufacturing laminations for an induction motor which comprises punching out of a ferrous strip, a segmental field lamination having one long and one short end and between those a pole piece offset toward the short end and provided with a projecting horn at such offset side and then punching out a corresponding lamination in reversed relationship with the material for the short and long arms removed substantially opposite the material taken out for the long and short arms for the first lamination and with the material for the pole piece and projecting horn removed substantially opposite the position of the material removed for the pole piece for the first lamination and between the position of the removed horn forming material and longer end forming material of the first lamination.

4. The method of manufacturing laminations for an induction motor which comprises punching out of a ferrous strip, a segmental field lamination having one long and one short end and between those a pole piece offset toward the short end and provided with a projecting horn at such offset side, then punching out a corresponding lamination in reversed relationship with the material for the short and long arms removed substantially opposite the material taken out for the long and short arms for the first lamination and with the material for the pole piece and projecting horn removed substantially opposite the position of the material removed for the pole piece for the first lamination and between the position of the removed horn forming material and longer end forming material of the first lamination and then punching a rotor blank out of the material remaining between those portions removed for the reversely disposed horns of the two stator laminations.

GEORGE A. GILLEN.